United States Patent [19]
Nash et al.

[11] Patent Number: 4,920,742
[45] Date of Patent: May 1, 1990

[54] HEAT SHIELD FOR GAS TURBINE ENGINE FRAME

[75] Inventors: Dudley O. Nash, Cincinnati; Ronald E. Quinn, Hamilton, both of Ohio

[73] Assignee: General Electric Company, Cincinnati, Ohio

[21] Appl. No.: 200,333

[22] Filed: May 31, 1988

[51] Int. Cl.$^5$ .............................................. F02C 7/20
[52] U.S. Cl. .................................. 60/39.32; 415/116; 415/134
[58] Field of Search .......................... 60/39.32, 39.83; 415/115, 116, 117, 134, 137, 138, 139, 178

[56] References Cited

U.S. PATENT DOCUMENTS

| | | | |
|---|---|---|---|
| 2,544,538 | 3/1951 | Mahnken et al. | 60/39.32 |
| 2,722,801 | 11/1955 | Lombard . | |
| 3,038,309 | 6/1962 | Waters . | |
| 3,104,525 | 9/1963 | Shields . | |
| 3,295,824 | 1/1967 | Woodwell et al. | 415/178 |
| 3,369,366 | 2/1968 | Howald . | |
| 3,403,889 | 10/1968 | Ciokajlo . | |
| 3,583,824 | 6/1971 | Smuland et al. | 415/117 |
| 3,826,088 | 7/1974 | Nash et al. . | |
| 3,892,497 | 7/1975 | Gunderlock et al. | 415/134 |
| 3,965,066 | 6/1976 | Sterman et al. | 415/115 |
| 4,013,376 | 3/1977 | Bisson et al. | 415/117 |
| 4,478,551 | 10/1984 | Honeycutt, Jr. et al. . | |
| 4,720,236 | 1/1988 | Stevens | 415/134 |

Primary Examiner—Louis J. Casaregola
Attorney, Agent, or Firm—Jerome C. Squillaro; Steven J. Rosen

[57] ABSTRACT

A heat shield assembly for use in a turbine engine frame includes inner and outer flowpath liners for shielding the inner and outer turbine frame members from hot exhaust gasses flowing through the turbine engine. The flowpath liners are supported on the turbine frame members with a support structure which allows the flowpath liners to freely expand and contract under thermally induced forces. In this manner thermal stresses are minimized. The flowpath liner support structure also provides uniform support for the flowpath liners and allows for the even and unobstructed flow of cooling air through the flowpath liners.

31 Claims, 6 Drawing Sheets

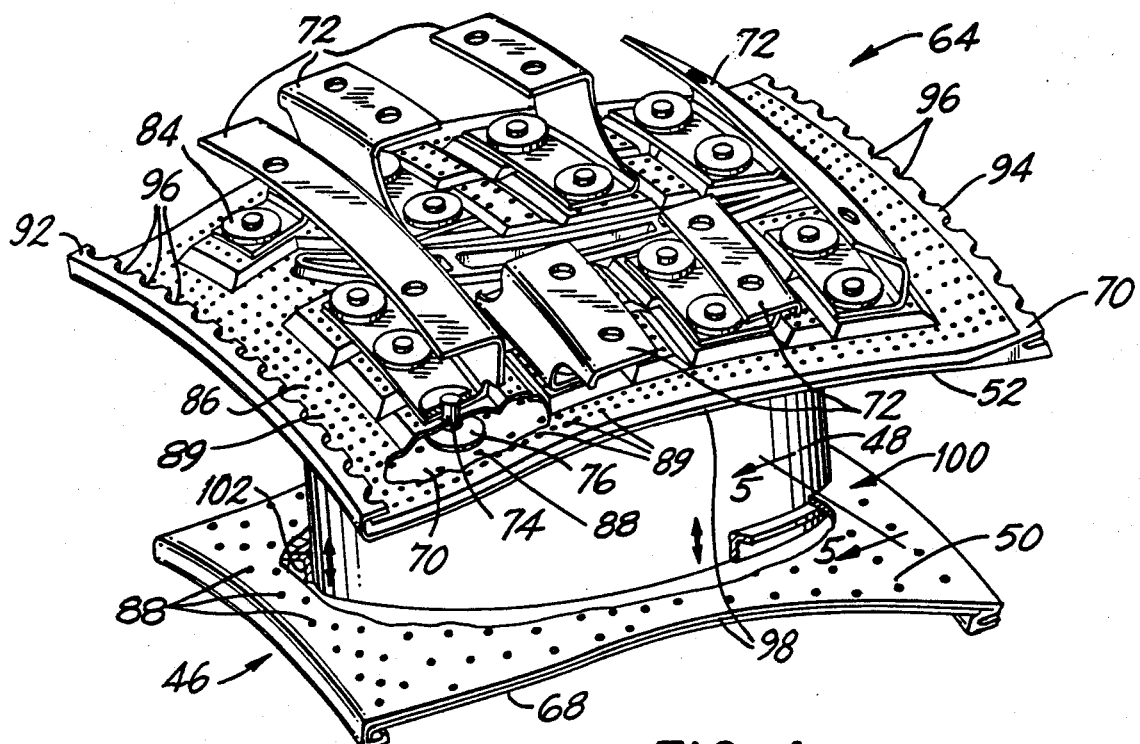
FIG. 4
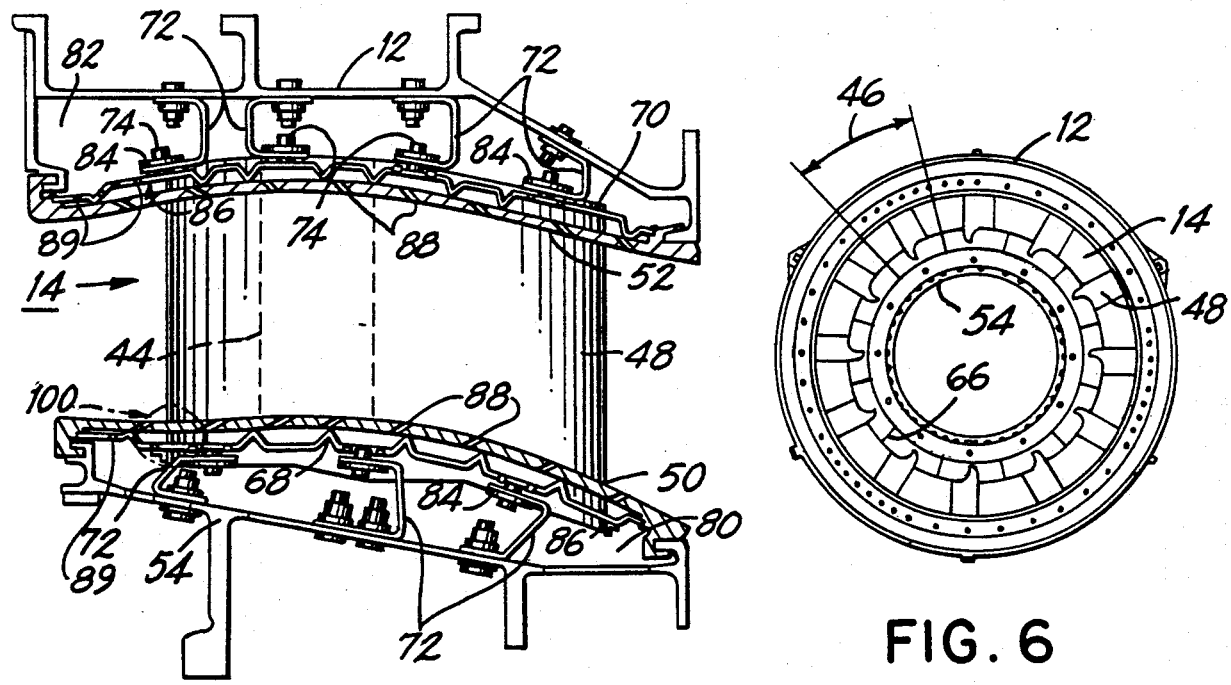
FIG. 5
FIG. 6

HEAT SHIELD FOR GAS TURBINE ENGINE FRAME

BACKGROUND OF THE INVENTION

The Government has rights in this invention pursuant to Contract No. F33657-83-C-0281 awarded by Department of the Air Force.

FIELD OF THE INVENTION

This invention is generally concerned with shielding and protecting the engine frame of a gas turbine engine from hot gasses discharged through the engine flowpath and particularly concerns a free-floating flowpath liner and outlet guide vane support structure which is adapted to accommodate thermal expansion of the flowpath liner and outlet guide vane without interfering with cooling air flow patterns.

DESCRIPTION OF PRIOR DEVELOPMENTS

Aircraft turbine engines employ two or more structural assemblies known as frames to support and accurately position the engine rotor within the stator. Each frame includes a stationary hub supported within a stationary casing by a number of radial struts contoured for minimum interference with the engine flow. The frame at the rear of the engine, usually aft of the turbine, is typically protected from the extreme turbine discharge gas temperatures by air cooled heat shields which include flowpath liners and outlet guide vanes.

Heat shields are necessary to protect the engine frame because of the limited heat tolerance of available frame construction materials. Heat shields are also used to limit the thermal expansion and distortion of the frames. Excessive expansion and distortion of the frames caused by thermal gradients adversely affects the alignment of the rotor within the engine thereby adversely affecting engine performance.

On modern engines, the heat shields enclosing the struts on the rear frame are contoured to remove any swirl remaining in the turbine discharge flow. The removal of swirl is required for proper functioning of the engine augmentor and exhaust nozzle. These contoured heat shields which protect the struts are known as the outlet guide vanes. The heat shields which protect the hub and casing are known as flowpath liners and together with the outlet guide vanes thermally shield the entire rear engine frame.

As the hot gasses exiting the combustion and turbine section of an advanced gas turbine engine can be above the melting temperature of the available materials used in heat shield construction, the heat shields themselves must be efficiently cooled. The more efficient the heat shield cooling system is, the less cooling air is required to cool the heat shields and the more efficient is the overall turbine engine cycle.

One of the most efficient methods of cooling the heat shields combines impingement cooling with film cooling. In this dual cooling method the cooling air first passes through a perforated plate known as an impingement baffle. The impingement baffle divides the cooling air into a multitude of small, high velocity jets which impinge on and cool the back surface of the metal heat shields forming the flowpath liners. This portion of the cooling method is called impingement cooling.

The cooling air is then introduced into the engine flowpath through slots or angled holes known as air cooling film injection holes which extend through the flowpath liners. This creates a thermally protective film of cool air on the surfaces of the flowpath liners which are directly exposed to the hot exhaust gasses. This portion of the cooling method is called film cooling.

A cooling system of this type, in order to maintain sufficient cooling air flow, requires a significant differential pressure to exist between the cooling air flowing behind and through the flowpath liners and the hot gas flowing through the engine flowpath. The heat shield support structure must be designed to tolerate this relatively large pressure loading and support the flowpath liners in a structurally efficient manner in order to provide a low weight structure required for use in gas turbine engines, particularly those engines used in aircraft applications.

A long standing problem in designing heat shields for turbine engine frames has been the constraint of the thermal expansion of the hot flowpath heat shield surfaces caused by lower temperature structural ribs used to reinforce the heat shields. These ribs were necessary to strengthen the heat shields so that the heat shields could withstand the cooling air pressure loads. The constraint of the thermal expansion of the heat shields caused by the relatively massive structural ribs has resulted in buckling and cracking of the flowpath liner surfaces and has imposed severe limits on the useful life of turbine frame heat shield systems incorporated within modern high performance engines.

As suggested above, weight poses another difficult problem in the design of turbine engine frame heat shielding systems. Since the heat shields enclose and encase the entire frame structure including the hub, the struts and the casing, considerable heat shield surface area is required and thus considerable weight tends to be involved in the resulting heat shield design.

Still another problem associated with conventional turbine engine frame heat shields is their virtual inability to provide a uniform distribution of perforations through the impingement baffles and a uniform distribution of air cooling film injection holes through the flowpath liners. That is, conventionally designed turbine engine frame heat shields have used rail and track assemblies to attach the flowpath liners to the engine frames and to provide freedom for relative thermal expansion therebetween. This type of attachment often prevented the use of impingement baffles or detracted from their efficient design and complicated or prevented the uniform placement of air cooling film injection holes through the flowpath liners. This resulted in non-uniform or obstructed flow of cooling air through the impingement baffles and flowpath liners leading to the creation of hot spots on the flowpath liners.

Accordingly, a need exists for a structurally efficient and lightweight turbine engine heat shield assembly which freely accommodates thermal expansion and which is readily adaptable for use with an impingement baffle. A need also exists for a turbine engine frame heat shield assembly having a uniform distribution of air cooling film injection holes formed through the flowpath liners and outlet guide vanes. A further need exists for a turbine frame heat shield assembly which can withstand extreme pressure differentials between the cooling air and the exhaust gasses.

SUMMARY OF THE INVENTION

The present invention has been developed to fulfill the needs noted above and therefore has as an object the provision of a structurally efficient and lightweight turbine engine heat shield assembly which may be used with or without an impingement baffle. If an impingement baffle is used, it is an object to allow for the free flow of cooling air through the entire extent of the impingement baffle.

Another object is to provide a turbine engine heat shield assembly having a uniform distribution of air cooling film injection holes arranged to provide uniform film cooling over the entire surface of the turbine engine heat shield assembly which is directly exposed to hot exhaust gasses.

Perhaps the most significant object of the invention is the provision of a turbine engine heat shield assembly which virtually eliminates prior thermally induced warping and fatigue cracking problems by allowing for the substantially free movement of the flowpath liners during thermal expansion and contraction in all directions.

Still another object of the invention is to provide a turbine engine heat shield assembly which avoids the use of heavy structural reinforcing ribs yet can withstand greater differential pressures between the cooling air and exhaust gasses than conventional assemblies.

These objects have been achieved with the turbine engine heat shield assembly of the present invention which replaces fixed stiffening ribs and heavy strengthening sections with a lightweight heat shield support assembly which directly supports the flowpath liners and readily accommodates thermal expansion by allowing the flowpath liners to float freely about the heat shield support assembly.

Briefly, the present invention includes at least one flowpath liner support structure which applies virtually no fixed mechanical constraint to the flowpath liners as they thermally expand and contract. By eliminating virtually all rigid constraint of the flowpath liners during thermal expansion, thermal stresses are reduced to a minimum. The flowpath liner support structure includes flowpath liner support brackets which are securely bolted to the turbine engine casing and/or hub for transmitting loads from the flowpath liners to the engine frame.

The flowpath liner support brackets are attached to the flowpath liners via support posts which are preferably brazed on the flowpath liners in a substantially uniform distribution. Clearance holes are formed in the flowpath liner support brackets for receiving the support posts. The clearance holes provide sufficient axial and circumferential transverse clearance around the support posts to allow the flowpath liners to move freely relative to the support brackets. Radial freedom is provided by a slip joint formed between the outlet guide vanes and the inner flowpath liner.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In The Drawings:

FIG. 4 is a perspective view, partially in section, of one segment of the annular turbine frame heat shield according to the invention showing the arrangement of the flowpath liner support assembly;

FIG. 5 is a side elevation view, partly in section showing the attachment of the flowpath liner support brackets to the outer casing, to the hub and to the flowpath liners;

FIG. 6 is a front elevation view of the annular turbine frame structure assembled from a plurality of segments as shown in FIG. 4;

In the various figures of the drawing, like reference characters designate like parts.

DETAILED DESCRIPTION OF THE PREFERRED EMBODIMENTS

Figure 1:
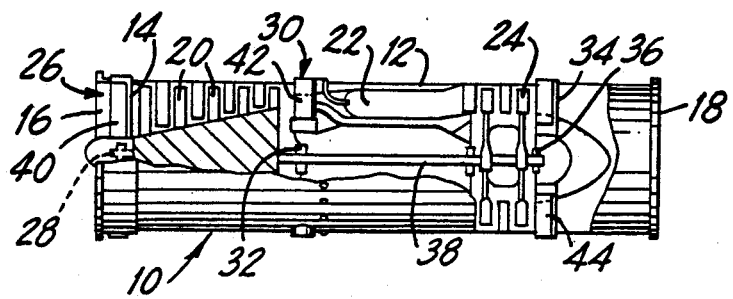
FIG. 1 is a schematic side elevational view, partially in section, of a gas turbine engine showing the general configuration of the gas turbine engine and the location of the engine frames.

A brief description of the major features of a gas turbine engine will aid in the appreciation of the present invention by identifying the location and arrangement of the turbine frame assemblies to which the heat shields are applied. Referring first to FIG. 1, a portion of a gas turbine engine (10) is illustrated in partial cross-section. The engine (10) includes an outer casing (12) which surrounds an annular flowpath (14) extending axially between an inlet (16) and an exhaust outlet (18) located at opposite ends of the engine (10).

During engine operation, ambient air is drawn into the inlet (16) and is compressed to a higher pressure in a compressor (20), from which the compressed air is discharged into an annular combustor (22) where fuel is burned to produce high energy products of combustion. From the combustor (22), the motive fluid is directed through a turbine (24) where a portion of its energy is extracted to drive the compressor (20), and the fluid is then discharged as a high energy stream through the exhaust outlet (18).

To maintain the various components of the engine in their proper operating positions relative to each other, engine frame assemblies are provided for rigidly interconnecting the stationary stator components and for providing bearing supports for the rotor. More particularly, the engine (10) includes a front frame assembly (26) supporting a front bearing (28), a mid-frame assembly (30) supporting a mid-shaft bearing (32), and a turbine frame (34) supporting an aft bearing (36). The rotor (38) is rotatably mounted in bearings (28, 32 and 36).

Each frame assembly (26, 30, and 34) respectively includes a plurality of airfoil shaped radial support struts (40, 42, and 44) which project across the annular flowpath (14) to interconnect the inner and outer frame members of the frame assemblies. Since the temperature of the motive fluid flowing through the flowpath (14) changes very rapidly during transient engine operation, substantial thermal stresses can be created in the rigid frame assemblies if the struts are allowed to heat up and cool down at rates differing substantially from those of the inner and outer frame members. This is particularly true with respect to the turbine frame assembly (34) since the exhaust gases which surround the turbine frame assembly are subject to the most rapid and greatest changes in operating temperatures and resulting thermal stresses.

For this reason, the present invention, which prevents destructive thermal stresses, is illustrated in conjunction with a turbine frame analagous to turbine frame (34). However, the present invention is equally applicable to other rigid assemblies, such as the front and mid-frame assemblies (26 and 30) which may also be exposed to motive fluid experiencing substantial and rapid changes in temperature.

Figure 2:
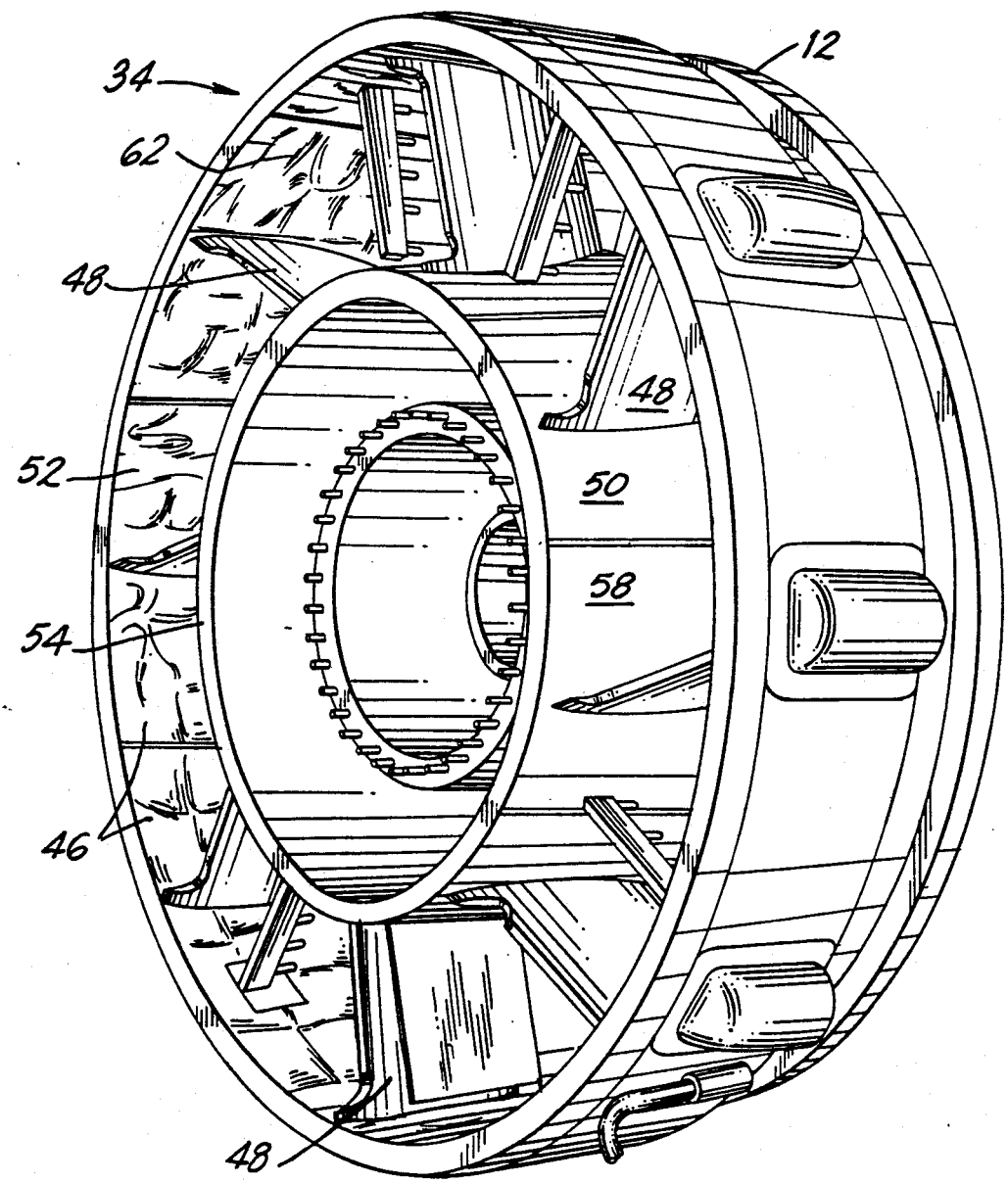
FIG. 2 is a perspective view of a conventional heat shielded turbine frame which has been damaged by distortion of the flowpath liners and heat shield segments.
Figure 3:
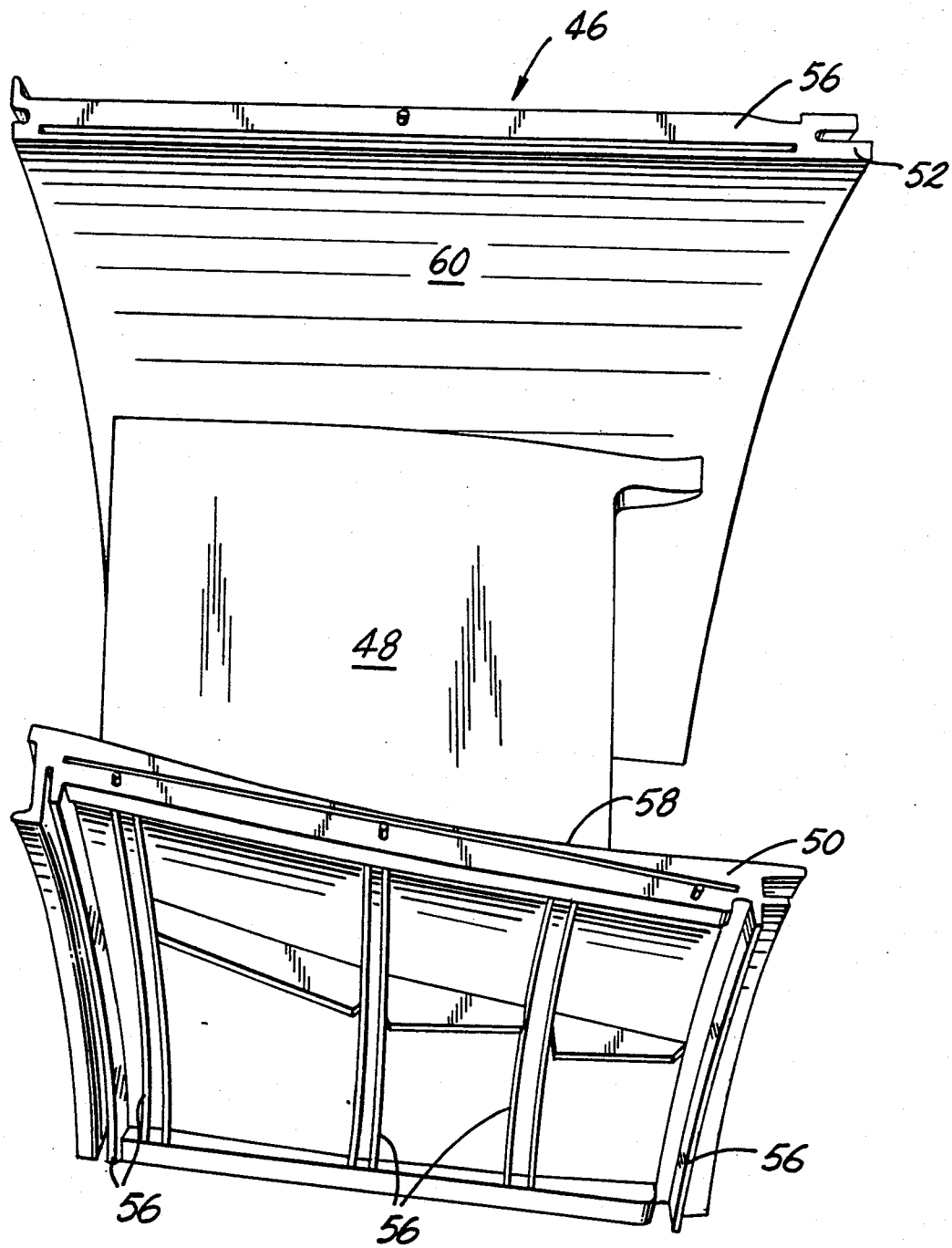
FIG. 3 is a perspective view of a conventional heat shield segment.

FIG. 2 shows a heat shielded turbine frame assembly (34) which is typical of previous frame designs for high temperature turbine engines. The rigid frame assembly (34) is shielded from the hot turbine exhaust gasses by a series of circumferentially arranged liner segments (46), one of which is shown in FIG. 3. Each liner segment is composed of an outlet guide vane (48), an inner flowpath liner (50) and an outer flowpath liner (52).

The outlet guide vane (48) surrounds and shields a radially extending strut (44) (FIG. 1) from the extreme temperature environment produced by the hot engine exhaust gasses. The outlet guide vane (48) is contoured to minimize aerodynamic losses, and to remove residual turbine swirl. The outer flowpath liner (52) and the inner flowpath liner (50) respectively shield the outer frame member i.e., the outer casing (12) and the inner frame member i.e., the inner hub (54) from the hot exhaust gasses.

As seen in FIG. 3, the inner and outer flowpath liners (50,52) are supported at their forward and aft ends only and therefore must be reinforced to tolerate the large differential pressure which exists between the cooling air pressure and the hot flowpath gas pressure. The structural strength necessary to withstand this pressure loading is provided by the heavy ribs (56). These ribs, although structurally adequate to carry the pressure loading, present a thermal stress problem as well as a weight problem.

The ribs (56) are directly exposed to the cooling air and therefore operate at a considerably lower temperature than the heat exposed flowpath surfaces (58, 60) of the respective inner and outer flowpath liners (50, 52). The temperature difference between the ribs (56) and the flowpath liner surfaces (58, 60) causes thermal stresses in excess of the yield strength of the liner material and results in distortion of the flowpath liners. Typical distortion of this type can be seen in FIG. 2 as surface irregularities (62).

This thermally induced flowpath distortion is undesirable since it alters and distorts the surface configuration of the engine flowpath thereby introducing aerodynamic losses. Distortion of the flowpath can cause hot spots resulting in burnout of the flowpath liners (50, 52), fatigue cracking and, over time, can result in a loss of the structural integrity of the flowpath liners and engine frame members causing their collapse under the differential pressure loading of the cooling air and exhaust gasses. Clearly, a better structural approach is needed in turbine frame heat shield design in order to avoid such thermal distortion and fatigue crack failure.

A particularly effective solution to the aforementioned problems is shown in FIG. 4 wherein a turbine frame heat shield segment (46) is provided with at least one flowpath liner support structure (64) which is adapted to allow the flowpath liners (50, 52) to freely expand and contract due to changes in temperature. Virtually no fixed mechanical constraint is applied by the support structure (64) to the flowpath liners (50, 52). By eliminating all rigid constraint of the flowpath liners during thermal expansion, thermal stresses and fatigue cracking of the flowpath liners are minimized and virtually eliminated.

A number of the heat shield segments (46) of FIG. 4 are mounted within the turbine frame structure as seen in FIG. 5, and arranged circumferentially as shown in FIG. 6. The heat shield segments, so arranged, effectively isolate and protect the structural elements of the frame from the hot gases which flow through the engine flowpath (14).

As best seen in FIGS. 5 and 6, the turbine frame structure includes a rigid cylindrical outer casing (12) and a rigid cylindrical inner hub (54) interconnected by radial support struts (44) extending across the flowpath (14). The heat shielding is divided into segments (46) having a sealed clearance gap (66) between adjacent segments to accommodate circumferential thermal expansion. One outlet guide vane (48) is provided per segment to surround and shield the radial support struts (44). Forces from cooling air pressure loads on the flowpath liner internal surfaces (68, 70) are transmitted directly to the inner hub (54) and outer casing (12) through the flowpath liner support structures (64) which are attached to the inner and outer flowpath liners (50, 52) and bolted to the engine frame structure, namely, to the inner hub (54) and outer casing (12).

As a result of the thermally induced flowpath distortion found in previous heat shielded turbine frame assemblies, the inner and outer flowpath liners (50, 52) which thermally shield the turbine frame purposely avoid using heavy or thick material sections or deep stiffening ribs. Most importantly, the inner and outer flowpath liners (50, 52) are well reinforced yet freefloating under thermally generated forces. Cooling air pressure loads are directly carried by the flowpath liner support brackets (72) and support posts (74) to the outer casing (12) and to the inner hub (54) as seen in FIG. 5. This type of direct support eliminates the need for the heavy ribs (56) shown in FIG. 3.

Accordingly, the heavy ribs needed to support the flowpath liners under the coolant pressure loading in FIG. 3 have now been replaced with the evenly distributed, direct support of the flowpath liner support brackets (72) as shown in FIGS. 4 and 5. The flowpath liner support brackets (72) are preferably formed as three-sided channel members having C-shaped cross sections to provide maximum support with minimum material. When compared to a comparable size heat shielded turbine frame of the previous construction shown in FIGS. 2 and 3, this improved heat shielding construction of FIGS. 4, 5 and 6 has resulted in a weight saving of approximately forty pounds per frame assembly, with the presently improved heat shield system being able to handle twice the pressure loading at higher engine operating temperatures.

Figure 7:
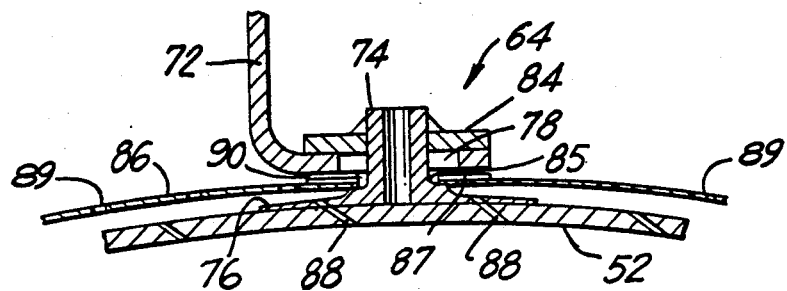
FIG. 7 is an enlarged sectional view taken through the free floating flowpath liner support assembly.
Figure 8:
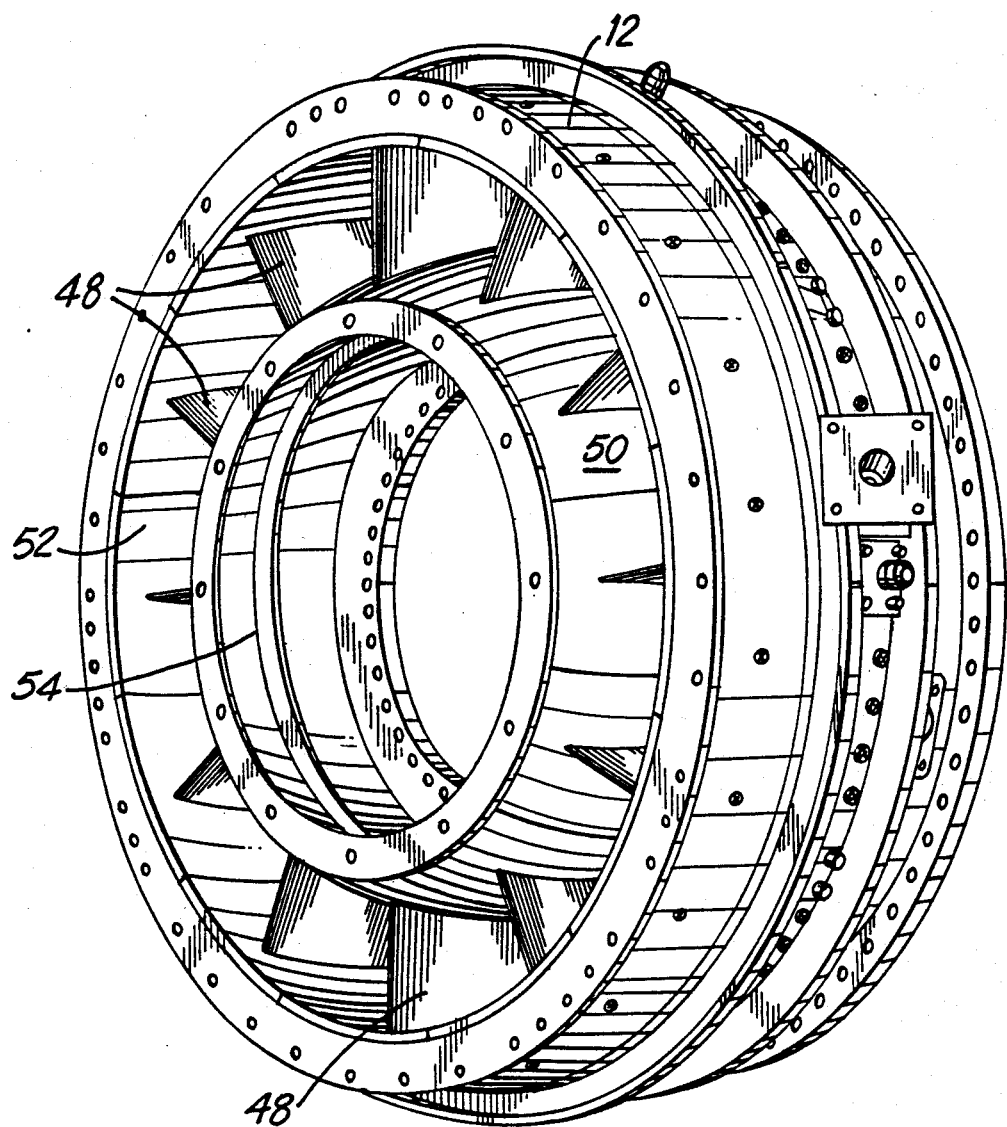
FIG. 8 is an aft perspective view of the turbine frame and heat shield assembled from the segments of FIG. 4.

As seen in FIGS. 3, 5 and 7, at least one and preferably several flowpath liner support brackets (72) are attached to the inner and outer flowpath liners (50, 52) via radially extending support posts (74). A detailed section through one of the support posts (74) which support the flowpath liners (50, 52) is shown in FIG. 7. Each support post is formed with a base portion or support pad (76) and at least one and preferably several support posts are provided on the inner and outer flowpath liners (50, 52). The support pads are rigidly fixed directly to the internal surfaces (68, 70) of the inner and outer flowpath liners (50, 52) such as by brazing and are arranged to provide uniform support over the pressure loaded flowpath liner internal surfaces (68, 70). The wide bases of the support pads help to evenly distribute the pressure loads while providing a large contact surface area with the inner and outer flowpath liners.

The flowpath liner support brackets (72) are each formed with at least one and preferably several oversized clearance holes (78) which provide adequate transverse clearance with respect to the axes of radially extending support posts (74) so that the support posts are to a limited extent free to float transversely, that is, axially and circumferentially within the clearance holes (78). This clearance fit frees the flowpath liners to move freely relative to the support brackets (72).

The free floating support of the flowpath liners (50, 52) via the support posts (74) as provided by this transverse clearance allows the flowpath liners to expand thermally in any direction with respect to the lower temperature outer casing (12) and inner hub (54). This feature minimizes thermal stresses within the flowpath liners (50, 52) and virtually eliminates any related thermally induced flowpath liner distortion.

The pressure load of the cooling air upon the internal surfaces (68, 70) of the flowpath liners within the annular cavities (80, 82) shown in FIG. 5 is reacted by the inner hub (54) and outer casing (12) via a plurality of axially and circumferentially extending engagement surfaces. Preferably, the engagement surfaces are formed by washers (84) which are permanently attached such as by brazing to the upper or outer radial end portion of each support post (74). Each washer (84) has an engagement portion which engages an inner surface of a support bracket and thereby limits the inward radial movement of the flowpath liners (50, 52) toward the engine flowpath (14). Each flowpath liner support bracket (72) is in turn rigidly bolted to the respective turbine frame member such as the inner hub (54) and the outer casing (12) to provide the required strength to support the flowpath liners under the pressure load of the coolant.

The support pads (76) also may provide support for a 0.010 inch thick impingement baffle (86) which includes impingement holes 89 and receives approximately five pounds per square inch pressure load. This impingement baffle is mounted to at least one of the flowpath liners (50, 52) for uniformly distributing cooling air over the surfaces of the flowpath liners (50, 52). It can be appreciated that this arrangement of support posts and support brackets allows the cooling air to flow evenly through the impingement baffles without restricting the cooling air flow. As further seen in FIGS. 4, 5, and 7, the cooling air injection holes (88) may be arranged uniformly over the entire extent of each flowpath liner (50, 52) to establish film cooling on the liners.

During engine operation, the impingement baffles (86) which form part of the heat shield structure are maintained at a lower temperature than the flowpath liners (50, 52). As a result, differential thermal expansion takes place between the impingement baffles (86) and the flowpath liners (50, 52). A small radial clearance (90) may be provided to avoid contact or wear between the support bracket and impingement baffle during relative movement between them, thereby ensuring a free-floating interconnection between the flowpath liner and support bracket.

To further accommodate this movement caused by differential thermal expansion, at least one and preferably several oversized holes (85) are formed in the impingement baffles (86) to provide axial and circumferential clearance around the support posts (74). Those portions of the impingement baffles (86) adjacent the oversized holes (85) are locally reinforced with thin washers (87) which may be brazed to the impingement baffles so as to leave the small clearance (90) noted above. The washers (87) protect the thin impingement baffle from damage during the relative movement between the support posts (74) and the support bracket (72).

The cooling air injection holes (88) may be formed through the support pads (76) as well as through the flowpath liners so that the flowpath liner support structure (64) promotes high efficiency uniform air film cooling. Moreover, flowpath liner support structure (64) easily accommodates impingement baffle (86) and promotes uniform air flow therethrough. Prior designs could not accommodate or tolerate uniformly spaced air injection holes through the flowpath liner support structure.

The fore and aft edges (92) and (94) of the inner and outer flowpath liners (50, 52) are configured for edge support and coolant leakage control. To further accommodate thermal expansion these edges (92, 94) are provided with scallops (96) to increase the strain capability of these lower temperature portions of the flowpath liners. The scallops reduce thermal constraint along the fore and aft edges (92, 94) and correspondingly reduce or eliminate the consequent distortion of the flowpath liner surfaces exposed to the hot exhaust gasses. Also, grooved intersegment edges (98) which contain leakage control seals are compact and low in section depth to limit thermal expansion constraint.

Figure 9:
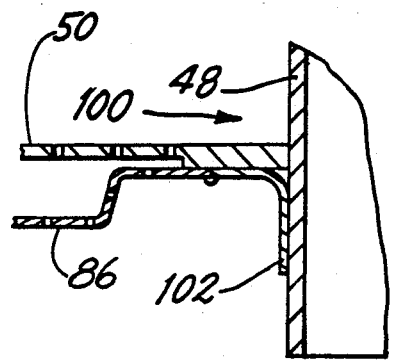
FIG. 9 is an enlarged fragmental view taken from FIG. 5 showing a sealed slip joint formed between the outlet guide vane and the inner flowpath liner.

In order to provide independent support of the inner and outer flowpath liners (50, 52) by the outer casing (12) and inner hub (54) it is necessary to provide radial freedom for radial thermal expansion of the outlet guide vane (48). This is necessary since the outlet guide vane (48) will expand more than the cooled strut (44). The necessary freedom is accomplished by a slip joint (100) (FIG. 5) which is equipped with a leakage control seal (102). The details of the slip joint and leakage control seal are shown in FIGS. 4 and 9.

The outlet guide vane (48) is preferably permanently fixed to the outer flowpath liner (52) by brazing and is resiliently and radially movably supported within an opening formed through the inner flowpath liner by the leakage control seal (102). The leakage control seal (102) may be formed of a thin sheet, band or tube of metal which encircles and grips the outlet guide vane with a resilient interference fit. As seen in FIG. 4, the leakage control seal (102) allows the outlet guide vane to slip radially through the opening in the inner flowpath liner (50) such as represented by the radial directional arrows. By allowing the outlet guide vane to radially and circumferentially expand and contract through the slip joint (100), thermal stresses between the inner and outer flowpath liners and the outlet guide vanes are prevented.

Another advantage of the slip joint (100) is the ability of the spring loaded leakage control seal (102) to axially and circumferentially expand and contract with any movement of the outlet guide vane so that an effective coolant seal is always maintained therebetween. Moreover, the axial and circumferential spring loading of the leakage control seal allows for increased assembly tolerances between the outlet guide vanes (48) and the inner flowpath liner (50).

In prior designs where the outlet guide vane was rigidly fixed to both the inner and outer flowpath liners. Differential expansion of the outlet guide vanes (48) relative to the struts (44) was accommodated by eliminating any attachment of the inner flowpath liner (50) to the frame hub (54) or any attachment of the outer flowpath liner (52) to the casing (12). While this accommodated the relative expansion, the absence of any support for the flowpath liner, other than the outlet guide vane itself, resulted in a great reliance on ribs (56) which in turn resulted in thermal distortion as mentioned previously.

Figure 10:
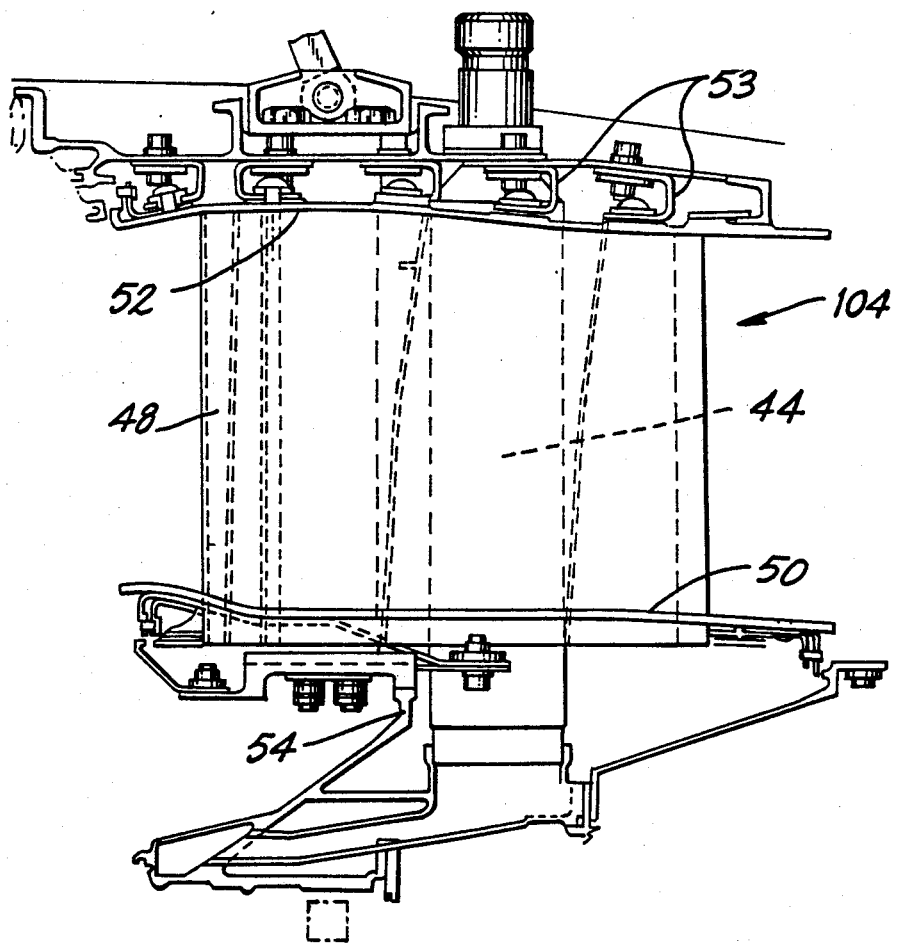
FIG. 10 is a side elevation view, partly in section, showing an alternate embodiment of a flowpath liner support assembly which functions without impingement baffles and without film cooling of the inner flowpath liner.
Figure 11:
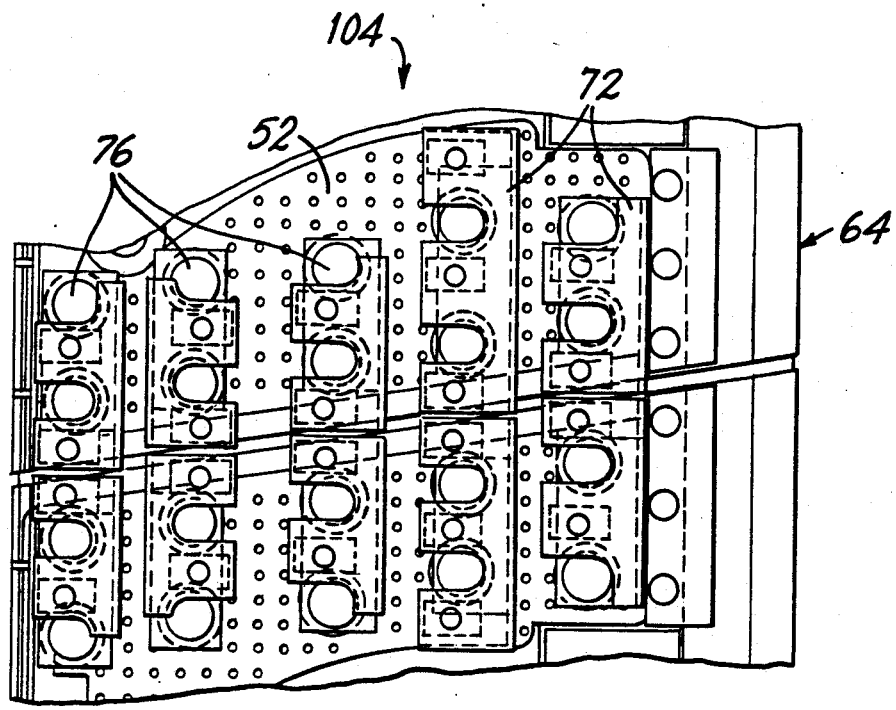
FIG. 11 is a fragmental top plan view of the free floating flowpath liner support assembly of FIG. 10.

In order to simplify the design and manufacture of the turbine frame assembly shown in FIGS. 4 through 8, the turbine engine frame assembly (104) shown in FIGS. 10 and 11 has been designed without impingement baffles. Moreover, the overall design of the turbine engine frame assembly (104) has been further simplified by eliminating the support structure (64) from the inner flowpath liner (50).

Film cooling is applied to only the outer flowpath liner (52) and to the outlet guide vane (48). The inner flowpath liner (50) which is made of a high temperature resistant material is convection cooled only by the cooling air which flows through the outlet guide vanes thereby cooling the struts (44) and finally cooling the inner hub (54) before discharging into the engine flowpath (14). Instead of forming the inner flowpath liner in segments it is formed as a continuous one-piece member to eliminate intersegment leakage of coolant and the need for intersegment seals. This alternate construction trades lower cost for slightly reduced cooling efficiency and is typical of variations on the basic design which may be devised.

As with the previously discussed flowpath liner support structure (64) of FIGS. 4 through 8, the even distribution of the support brackets (72) shown in FIGS. 10 and 11 allows for free and uniform air flow over the flowpath liners and provides uniform structural support to the flowpath liner (52).

Figure 12:
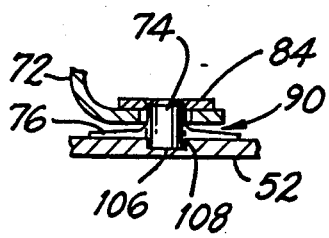
FIG. 12 is a fragmental sectional view of an alternate embodiment of a support pad for the free floating flowpath liner support assembly.

An alternate design of the support pad (76) is shown in FIG. 12 wherein a locating projection (106) is provided on the bottom of each support pad. The flowpath liners (50, 52) are provided with complimentary matching locating recesses (I08) to receive the projections. This design assures the correct and accurate location of each support pad (76) and flowpath support post (74) on the flowpath liners (50, 52).

There has been disclosed heretofore the best embodiment of the invention presently contemplated. However, it is to be understood that various changes and modifications may be made thereto without departing from the spirit of the invention.

What is claimed is:

1. A support structure for supporting a flowpath liner on a turbine engine frame member, wherein said support structure comprises:
   a support bracket connected to said turbine engine frame member;
   a support means connected to said flowpath liner, said support means engaging said support bracket with a free-floating interconnection to freely accommodate axial and circumferential thermal expansion and contraction of said flowpath liner; and
   a clearance hole formed in said support bracket wherein said support means projects through said clearance hole to provide said free-floating interconnection therebetween.

2. The support structure of claim 1, wherein said support means comprises a support post projecting from said flowpath liner, said support post being loosely connected to said support bracket.

3. The support structure of claim 1, wherein said support means comprises a support pad connected to said flowpath liner, said support pad having a broad base portion for evenly distributing loads over said flowpath liner.

4. The support structure of claim 3, wherein said support pad is connected to said flowpath liner by a brazed joint.

5. The support structure of claim 1, wherein said support means comprises engagement means for engaging said support bracket and for reacting pressure loads from said flowpath liner to said turbine engine frame member.

6. The support structure of claim 5, wherein said engagement means comprises a washer provided on an end portion of said support means.

7. The support structure of claim 1, wherein said support means comprises a locating projection and wherein said flowpath liner comprises a locating recess for receiving said locating projection and for accurately locating said support means on said flowpath liner.

8. The support structure of claim 1, wherein said flowpath liner further comprises impingement cooling means mounted on said flowpath liner and disposed between said flowpath liner and the turbine engine frame member for directing cooling air over said flowpath liner.

9. The support structure of claim 8, wherein said impingement cooling means comprises an impingement baffle supported by said support means.

10. The support structure of claim 9, wherein said impingement baffle is provided with a uniform distribution of perforations for uniformly cooling said flowpath liner.

11. The support structure of claim 1, wherein said flowpath liner is formed with a plurality of cooling air injection holes for film cooling said flowpath liner.

12. The support structure of claim 1, wherein said support bracket is bolted to said turbine engine frame member.

13. The support structure of claim 1, wherein said turbine engine frame member comprises an outer casing.

14. The support structure of claim 1, wherein said turbine engine frame member comprises an inner hub.

15. The support structure of claim 1, wherein said free-floating interconnection includes a means to provide for two-dimensional movement of said flowpath liner with respect to said support bracket and with respect to said turbine engine frame member.

16. The support structure of claim 1, further comprising a slip joint provided on said flowpath liner for resiliently receiving and supporting an outlet guide vane therein.

17. The support structure of claim 16, wherein said flowpath liner is formed with an opening therethrough and wherein said slip joint comprises a leakage control seal provided around said opening for allowing axial, radial and circumferential movement of said outlet guide vane with respect to said flowpath liner.

18. A floating heat shield for a turbine engine frame, comprising:
 a flowpath liner for protecting said turbine engine frame from hot exhaust gasses;
 a plurality of radially extending support posts attached to said flowpath liner; and
 a support bracket attached to said turbine engine frame for supporting said flowpath liner, said support bracket having at least one clearance hole formed therein for receiving one of said plurality of radially extending support posts with a clearance fit, said clearance fit providing freedom for said flowpath liner to move freely relative to said support bracket during thermal expansion and contraction of said flowpath liner.

19. The free floating heat shield of claim 18, wherein each one of said plurality of radially extending support posts comprises engagement means for limiting radial inward movement of said flowpath liner.

20. The free floating heat shield of claim 19, wherein said engagement means comprises a washer permanently attached to a radial outer end portion of each one of said plurality of radially extending support posts.

21. The free floating heat shield of claim 18, further comprising impingement cooling means provided on said flowpath liner.

22. A floating heat shield for a turbine engine frame having an inner casing, an outer casing and a plurality of radial struts interconnecting said inner and outer casings, said heat shield comprising:
 at least one support bracket rigidly connected to said outer casing, said support bracket having at least one clearance hole formed therein;
 an outer flowpath liner having at least one radially extending support post rigidly fixed thereto; said support post having an engagement portion; and
 a free floating connection freely interconnecting said support bracket and said outer flowpath liner, said free floating connection formed by said support post passing through said clearance hole with a clearance fit to allow limited transverse movement of said support post therein and by said engagement portion limiting radial movement of said outer flowpath liner by engaging said support bracket.

23. The free floating heat shield of claim 22, wherein said at least one support bracket comprises a plurality of support brackets bolted to said outer casing and wherein said at least one support post comprises a plurality of support posts connected to said outer flowpath liner by a brazed joint.

24. The free floating heat shield of claim 22, wherein said engagement portion comprises an axially and circumferentially extending engagement surface permanently attached to a radial end portion of said support post.

25. The free floating heat shield of claim 22, further comprising an impingement baffle mounted to said outer flowpath liner, said impingement baffle having at least one oversized hole formed therein for receiving said support post with a clearance fit.

26. The free floating heat shield of claim 25, further comprising reinforcement means provided on said impingement baffle and surrounding said oversized hole for protecting said impingement baffle during relative movement between said support post and said support bracket.

27. A floating heat shield for a turbine engine frame, comprising:
 inner and outer flowpath liners and a hollow vane disposed between said flowpath liners for protecting said turbine engine frame from hot exhaust gasses, and a free floating support means for supporting said floating heat shield on a turbine engine frame member with a free-floating interconnection to freely accommodate axial and circumferential thermal expansion and contraction of said heat shield.

28. The free floating heat shield of claim 27, wherein said free floating support means comprises:
 a plurality of radially extending support posts attached to said flowpath liner; and a support bracket attached to said turbine engine frame for supporting said flowpath liner, said support bracket having at least one clearance hole formed therein for receiving one of said plurality of radially extending support posts with a clearance fit, said clearance fit providing freedom for said flowpath liner to move freely relative to said support bracket during thermal expansion and contraction of said flowpath liner.

29. The free floating heat shield of claim 28, wherein each one of said plurality of radially extending support posts comprises an engagement means for limiting radial inward movement of said flowpath liner.

30. The free floating heat shield of claim 29, wherein said engagement means comprises a washer permanently attached to a radial outer end portion of each one of said plurality of radially extending support posts.

31. The free floating heat shield of claim 28, further comprising impingement cooling means provided on said flowpath liner.

* * * * *